(12) United States Patent
Pearce

(10) Patent No.: US 7,923,639 B2
(45) Date of Patent: Apr. 12, 2011

(54) SEALING TAPE

(75) Inventor: David Pearce, Bassett (GB)

(73) Assignee: Tyco Electronics UK Ltd., Wiltshire (GB)

( * ) Notice: Subject to any disclaimer, the term of this patent is extended or adjusted under 35 U.S.C. 154(b) by 354 days.

(21) Appl. No.: 12/111,463

(22) Filed: Apr. 29, 2008

(65) Prior Publication Data

US 2008/0277139 A1 Nov. 13, 2008

(30) Foreign Application Priority Data

May 11, 2007 (GB) .................................. 0709104.4

(51) Int. Cl.
*H01B 7/00* (2006.01)
(52) U.S. Cl. ................................ 174/110 R; 174/120 R
(58) Field of Classification Search .................... 174/19, 174/20, 21 R, 22 R, 21 JS, 23 R, 74 R, 77 R, 174/84 R, 88 R
See application file for complete search history.

(56) References Cited

U.S. PATENT DOCUMENTS

| | | | | |
|---|---|---|---|---|
| 2,105,567 A | * | 1/1938 | Webb ........................ | 174/21 R |
| 2,195,933 A | * | 4/1940 | Marlborough et al. ..... | 174/21 R |
| 2,395,886 A | * | 3/1946 | Lee ............................ | 156/48 |
| 3,017,306 A | * | 1/1962 | Priaroggia .................. | 156/48 |
| 3,127,291 A | * | 3/1964 | Betz et al. .................. | 156/49 |
| 4,518,819 A | * | 5/1985 | Larsson et al. ............. | 174/78 |
| 4,570,032 A | | 2/1986 | Charlebois et al. | |
| 4,654,474 A | * | 3/1987 | Charlebois et al. ......... | 174/88 R |
| 5,374,784 A | * | 12/1994 | Wentzel .................... | 174/73.1 |
| 5,408,047 A | * | 4/1995 | Wentzel .................... | 174/73.1 |
| 5,714,715 A | * | 2/1998 | Sundhararajan et al. .... | 174/20 |

FOREIGN PATENT DOCUMENTS

| | | |
|---|---|---|
| EP | 0 967 706 A1 | 12/1999 |
| EP | 0 967 706 A1 * | 12/1999 |
| FR | 2 508 380 | 12/1982 |
| GR | 1 485 613 | 9/1977 |
| JP | 2000236619 | 8/2000 |
| JP | 2006-20388 | 1/2006 |

* cited by examiner

*Primary Examiner* — William H Mayo, III
(74) *Attorney, Agent, or Firm* — Barley Snyder LLC

(57) ABSTRACT

A cable joint includes at least two cables each having inner conducting elements. At least one of the cables has a layer of paper insulation impregnated with an oil. The inner conducting elements of the cables are secured to each other at a junction. A sealing tape has an inner layer and an outer layer. The sealing tape is wrapped about the junction such that the inner layer is in contact with the cables. The inner layer is provided with a deformable oil barrier including a sealing mastic that is resistant to chemical attack from the oil and resistant to migration of the oil there through. The outer layer carries the inner layer. The outer layer is provided with a substantially rigid tape that is resistant to deformation and expansion of the inner layer that forms a protective sleeve about the inner layer.

20 Claims, 1 Drawing Sheet

SEALING TAPE

CROSS-REFERENCE TO RELATED APPLICATIONS

This application claims the benefit of the filing date under 35 U.S.C. §119(a)-(d) of German Patent Application No. 0709104.4, filed May 11, 2007.

FIELD OF THE INVENTION

The invention relates to a sealing tape for cable joints having at least one cable with a layer of paper insulation impregnated with an oil wherein the sealing tape comprises an inner layer provided with an oil barrier layer and an outer layer that forms a protective sleeve about the inner layer.

BACKGROUND

It is know to use sealing tapes for cable joints, such as those involving the splicing together of two cables wherein at least one of the cables is a paper-insulated lead cable (PILC) that transmits electric current at so-called "medium" voltages up to approximately 20,000 volts. The PILC has an inner conducting core made, for example, of twisted strands of a conducting metal. The inner conducting core is surrounded along a length of the cable by a cylindrical layer of insulating paper that is impregnated with an oil. The layer of insulating paper is in turn surrounded along the length of the cable by an outer conductive jacket or sleeve made, for example, of lead or other conducting material. The layer of insulating paper acts as a dielectric that insulates the inner conductor from the outer conductive jacket. Although PILCs are rarely manufactured nowadays, many tens of thousands of meters of the cable type remain in service around the world. Therefore, a need remains for connecting the PILCs together and for connecting the PILCs to other types of cable.

In the PILCs, if migration of the oil occurs, the dielectric effect of the layer of insulating paper diminishes dramatically as the paper dries out. Generally this migration effect does not occur over the length of the cable that lies away from the cable ends; however, when an end of the PILC is spliced, a potential problem arises in that leakage paths exist for the oil.

One method of solving this problem is to enclose the cable joint with a rigid casing that includes a plurality of seals, such as the kind described in GB 1 485 613. The seals prevent deleterious migration of the oil from the paper layer. However, the arrangement of GB 1 485 613 is complicated. Not only does this arrangement make the cable joint expensive to manufacture, but also the assembly of the cable joint is a lengthy process that includes specific steps that must be completed in the correct order in order to assure leak-proofing of the cable joint. If the cable joint is assembled in a "field" situation by an inexperienced fitter therefore there is a danger of the steps not being completed correctly or in the correct order, such that the cable joint fails in service. Similarly if even one of the many components of the GB 1 485 613 cable joint becomes lost or damaged the integrity of the cable joint is compromised.

A further problem with the cable joint of GB 1 485 613 is that it does not seek to address the problems that can arise when the heating effect of electrical resistance in the cable of the PILC causes expansion of the oil in the layer of insulating paper. Under such circumstances the pressure of the oil within the cable joint can rise sufficiently that the oil is forced to leak out. High oil pressures can also arise when the cable joint is, for example, on a hillside, wherein a hydraulic head of oil above the cable joint can be adequate to promote the above-described migration of oil.

U.S. Pat. No. 5,374,784 proposes an arrangement in which the cable joint between two conducting elements of cables that are spliced together are encircled by an elastomeric sleeve. A heat-recoverable sleeve, for example, a sleeve made of a material that is pre-stressed to a shape that on heating reverts to a relaxed or recovered state that differs in shape from the pre-stressed shape, is used to surround the elastomeric sleeve. On heating the heat-recoverable sleeve shrinks to encircle the elastomeric member sufficiently tightly so that oil can not migrate into its interstices. Consequently, the oil can not enter into the material of the sleeve and a known effect of degradation of the sleeve does not, according to the disclosure of U.S. Pat. No. 5,374,784, occur.

However, the arrangement of U.S. Pat. No. 5,374,784 suffers from several disadvantages. First, the effect of the heat-recoverable sleeve is only of benefit while the pressure of the oil remains low. At higher pressures, the oil can force the elastomeric sleeve away from the cable joint and create voids. The oil can migrate into the voids and thereby cause failure of the insulation. Second, it is necessary for anyone fitting the cable joint of U.S. Pat. No. 5,374,784 in a "field" situation to carry a source of heat for heating the heat-recoverable sleeve. The need to carry such equipment has safety ramifications and generally complicates the process of creating the cable joint.

Further, JP 2000236619 discloses an arrangement in which an aluminum tape is used in conjunction with a complex structure in order to block oil leakage paths in the cable joint. A defect of this arrangement is that it is almost entirely rigid. Hence, it does not allow for small movements of the parts of the cable joint without the integrity of the cable joint becoming compromised. This in turn leads to failure of the dielectric layer in service.

SUMMARY

It is therefore an object of the invention to provide a sealing tape for sealing a cable joint having at least one cable with a layer of paper insulation impregnated with an oil, the sealing tape comprising an inner layer and an outer layer. The inner layer is provided with a deformable oil barrier including a sealing mastic that is resistant to chemical attack from the oil and resistant to migration of the oil there through. The outer layer carries the inner layer. The outer layer is provided with a substantially rigid tape that is resistant to deformation and expansion of the inner layer that forms a protective sleeve about the inner layer.

It is therefore a further object of the invention to provide a cable joint comprising at least two cables each having inner conducting elements. At least one of the cables has a layer of paper insulation impregnated with an oil. The inner conducting elements of the cables are secured to each other at a junction. A sealing tape has an inner layer and an outer layer. The sealing tape is wrapped about the junction such that the inner layer is in contact with the cables. The inner layer is provided with a deformable oil barrier including a sealing mastic that is resistant to chemical attack from the oil and resistant to migration of the oil there through. The outer layer carries the inner layer. The outer layer is provided with a substantially rigid tape that is resistant to deformation and expansion of the inner layer that forms a protective sleeve about the inner layer.

DETAILED DESCRIPTION OF THE EMBODIMENT(S)

Figure 1:
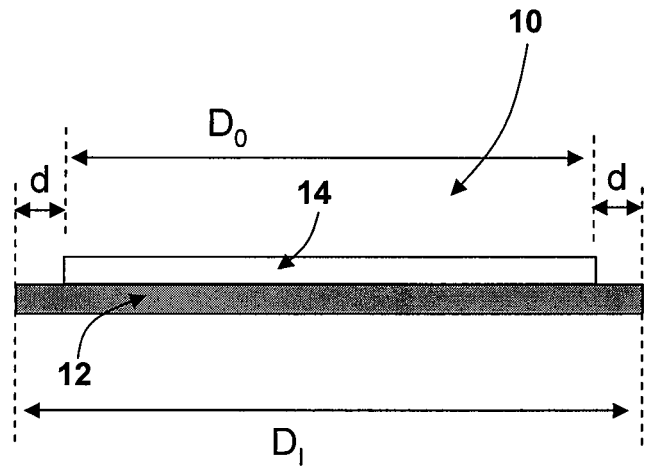
FIG. 1 is a schematic view of an end of a sealing tape according to a first embodiment of the invention.
Figure 2:
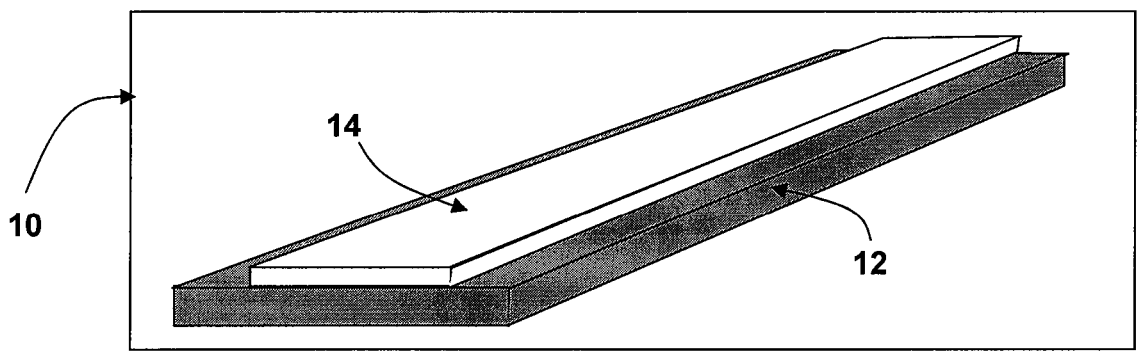
FIG. 2 is a perspective view of the sealing tape of FIG. 1.

FIGS. 1-2 show a sealing tape 10 according to a first embodiment of the invention. As shown in FIGS. 1-2, the sealing tape 10 includes an inner layer 12 and an outer layer 14. The inner layer 12 is carried on the outer layer 14. As shown in FIG. 1, the outer layer 14 has a width $D_O$ smaller than a width $D_1$ of the inner layer 12 such that the inner layer 12 extends a distance d from either side of the outer layer 14.

The inner layer 12 is made, for example, from a deformable material that acts as an oil barrier, such as a sealing mastic material which has been proven to provide the required resistance to chemical attack from oil required for use with PILCs. The outer layer 14 is made, for example, from a substantially rigid material, such as an elastic or fabric-based tape exhibiting a predetermined degree of stretch.

In the first embodiment shown in FIGS. 1-2, the inner layer 12 is formed, for example, from a material having the properties described in the below Table 1:

| Material for the Inner Layer | Parts Per Hundred (PHR) |
| --- | --- |
| polyepichlorohydrin copolymer elastomer (with ~26% wt chlorine and Mooney viscosity 65-75) | 100 |
| liquid nitrile rubber (with Brookfield viscosity of 20,000-40,000 cP) | 35-45 |
| pentaerythritol-based hindered phenol antioxidant (with a melting point in the range of 110-115° C.) | 2-5 |
| magnesium oxide | 3-6 |
| fumed silica (with a surface area of approximately 200 $m^2g^{-1}$) | 25-35 |
| C10-C13 chlorinated paraffin (with 60-71% chlorination) | 90-100 |
| N990-type thermal black carbon | 5-15 |

In the first embodiment shown in FIGS. 1-2, the outer layer 14 is formed, for example, from a material having the properties described in the below Table 2:

| Material for the Outer Layer | Parts Per Hundred (PHR) |
| --- | --- |
| high molecular weight polyisobutylene (with an average molecular weight of 2,110,000) | 100 |
| low molecular weight polyisobutylene (with an average molecular weight of 40,000) | 25-45 |
| carboxylated nitrile rubber (with Mooney viscosity of 40-55) | 10-15 |
| titanium dioxide | 80-120 |
| N550-type carbon black | 5-15 |
| octodecyl-based hindered phenol antioxidant (with a melting point in the range 49-54° C.) | 0.5-1.0 |

In other embodiments the inner layer 12 may be formed from a sealing mastic material based, for example, on other oil-barrier elastomers such as, epichlorhydrin, nitrile, fluorosilicone, polychloroprene and other fluoro-elastomers. In such embodiments, the outer layer 14 may be a tape formed, for example, from crosslinked, semi-crosslinked or high molecular weight elastomer-based materials selected from butyl, ethylene-propylene-diene-monomer (EPDM), epichlorohydrin, nitrile, silicone, fluorosilicone, thermoplastic vulcanisate rubber and other thermoplastic vulcanisates (TPVs), or a tape formed from a loose-weave fabric coated in an elastomer or a polypropylene fiber net coated in an elastomer. In such embodiments the elastomer may be, for example, silicone rubber.

The sealing tape 10 is used during the assembly of a cold-applied cable joint for a PILC in which an inner conducting element of the PILC is conductingly secured to an inner conducting element of another cable in the form of a PILC or another type of medium voltage cable. The sealing tape 10 is wrapped around a junction between the cables such that the sealing tape 10 overlies each of the cables in a vicinity of the junction between the inner conducting elements of the cables with the inner layer 12 in contact with the cables.

The width $D_O$ of the outer layer 14 relative to the width $D_1$ of the inner layer 12 ensures that the inner layer 12 forms a continuous layer about the junction and thereby forms a complete seal about the junction which is resistant to chemical attack from oil in the layer of insulating paper. It is also resistant to migration of the oil there through. The outer layer 14 forms an outer protective sleeve about the inner layer 12. The outer layer 14 of the sealing tape 10 thereby provides external protection against mechanical abrasion and cutting and provides an external hoop stress that prevents the inner layer 12 from deforming under internal pressure resulting from expansion of oil in the layer of paper insulation of the PILC. The protective sleeve provided by the outer layer 14 therefore maintains the seal created by the inner layer 12 and prevents the leakage of oil from the layer of insulating paper of the PILC.

Figure 3:
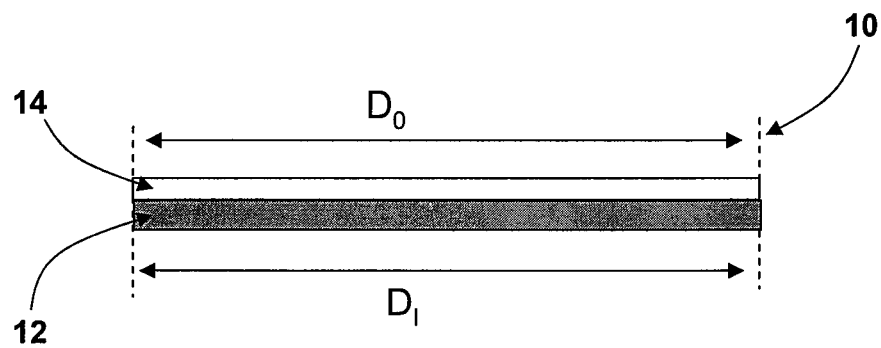
FIG. 3 is a schematic view of an end of a sealing tape according to a second embodiment of the invention.

FIG. 3 shows a second embodiment of the sealing tape 10 according to the invention. It is envisaged that in other embodiments, such as the embodiment shown in FIG. 3, the width $D_1$ of the inner layer 12 may be the same as the width $D_O$ of the outer layer 14 such that the inner layer 12 and the outer layer 14 are coextensive. In such embodiments, the inner layer 12 spreads during the step of wrapping the sealing tape 10 around the junction between the cables so as to form a continuous layer about the cables and thereby provides a complete oil seal about the cable joint.

The use of the outer layer 14 as a carrier for the inner layer 12 renders it possible to apply the seal and create the outer protective sleeve in a single step. This contrasts with other previously known methods of sealing a cable joint which require the application of a sealing material, such as, for example, a mastic material, to the cable joint and then the application of a separate sleeve or other protective element to prevent deformation of the mastic material. Additionally, as mentioned herein, the resultant joint between the cables created using the sealing tape 10 of the invention is "cold-applied." This means that there is no need for a heating step in order to seal the cable joint. This makes assembly of a large number of joints a particularly convenient exercise since the fitter needs only to wrap the sealing tape about each joint. No further finishing steps are needed. As a consequence the fitter can create a large number of joints during a working day.

In the sealing tape 10 according to the first and second embodiments of the invention, the combination of the inner layer 12 and the outer layer 14 provides a quick and simple means of sealing a cable joint between two cables, where at least one of the cables is a PILC, thereby providing both chemical and mechanical protective functions in a single step. No additional components, such as a heat source for example, are required, the provision of the outer layer rendering separate outer tubing, either hot- or cold-applied, unnecessary.

The outer layer 14 preferably takes the form of an elastic tape or a fabric-reinforced tape exhibiting a predetermined degree of stretch, thereby rendering the outer layer sufficiently flexible to allow the tape to be wrapped about a cable joint whilst ensuring that the outer layer 14 is sufficiently rigid to prevent, in use, deformation and expansion of the inner layer 12 that results from expansion of oil in the layer of insulating paper.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A sealing tape for sealing a cable joint having at least one cable with a layer of paper insulation impregnated with an oil, the sealing tape comprising:
    an inner layer provided with a deformable oil barrier including a sealing mastic that is resistant to chemical attack from the oil and resistant to migration of the oil there through; and
    an outer layer that carries the inner layer, the outer layer provided with a substantially rigid tape that is resistant to deformation and expansion of the inner layer that forms a protective sleeve about the inner layer.

2. The sealing tape of claim 1, wherein the tape is elastic.

3. The sealing tape of claim 2, wherein the tape is formed from a crosslinked, semi-crosslinked or high molecular weight elastomer-based material selected from butyl, ethylene-propylene-diene-monomer, epichlorohydrin, nitrile, silicone, fluorosilicone, or thermoplastic vulcanisate rubber.

4. The sealing tape of claim 1, wherein the tape is a stretchable fabric.

5. The sealing tape of claim 4, wherein the stretchable fabric is a loose-weave fabric coated in an elastomer or a polypropylene fiber net coated in an elastomer.

6. The sealing tape of claim 5, wherein the elastomer is silicone rubber.

7. The sealing tape of claim 1, wherein the sealing mastic includes an oil-barrier elastomer.

8. The sealing tape of claim 7, wherein the oil-barrier elastomer includes epichlorhydrin, nitrile, fluorosilicone, polychloroprene or a fluoro-elastomer.

9. The sealing tape of claim 1, wherein the inner layer has a width greater than a width of the outer layer such that the inner layer extends a distance from either side of the outer layer.

10. The sealing tape of claim 1, wherein a width of the inner layer is the same as a width of the outer layer such that the inner and outer layers are coextensive.

11. A cable joint, comprising:
    at least two cables each having inner conducting elements, at least one of the cables with a layer of paper insulation impregnated with an oil, the inner conducting elements of the cables being secured to each other at a junction;
    a sealing tape having an inner layer and an outer layer, the sealing tape being wrapped about the junction such that the inner layer is in contact with the cables;
    the inner layer provided with a deformable oil barrier including a sealing mastic that is resistant to chemical attack from the oil and resistant to migration of the oil there through; and
    the outer layer that carries the inner layer, the outer layer provided with a substantially rigid tape that is resistant to deformation and expansion of the inner layer that forms a protective sleeve about the inner layer.

12. The cable joint of claim 11, wherein the tape is elastic.

13. The cable joint of claim 12, wherein the tape is formed from a crosslinked, semi-crosslinked or high molecular weight elastomer-based material selected from butyl, ethylene-propylene-diene-monomer, epichlorohydrin, nitrile, silicone, fluorosilicone, or thermoplastic vulcanisate rubber.

14. The cable joint of claim 11, wherein the tape is a stretchable fabric.

15. The cable joint of claim 14, wherein the stretchable fabric is a loose-weave fabric coated in an elastomer or a polypropylene fiber net coated in an elastomer.

16. The cable joint of claim 15, wherein the elastomer is silicone rubber.

17. The cable joint of claim 11, wherein the sealing mastic includes an oil-barrier elastomer.

18. The cable joint of claim 17, wherein the oil-barrier elastomer includes epichlorhydrin, nitrile, fluorosilicone, polychloroprene or a fluoro-elastomer.

19. The cable joint of claim 11, wherein the inner layer has a width greater than a width of the outer layer such that the inner layer extends a distance from either side of the outer layer.

20. The cable joint of claim 11, wherein a width of the inner layer is the same as a width of the outer layer such that the inner and outer layers are coextensive.

* * * * *